United States Patent Office 3,370,526
Patented Feb. 27, 1968

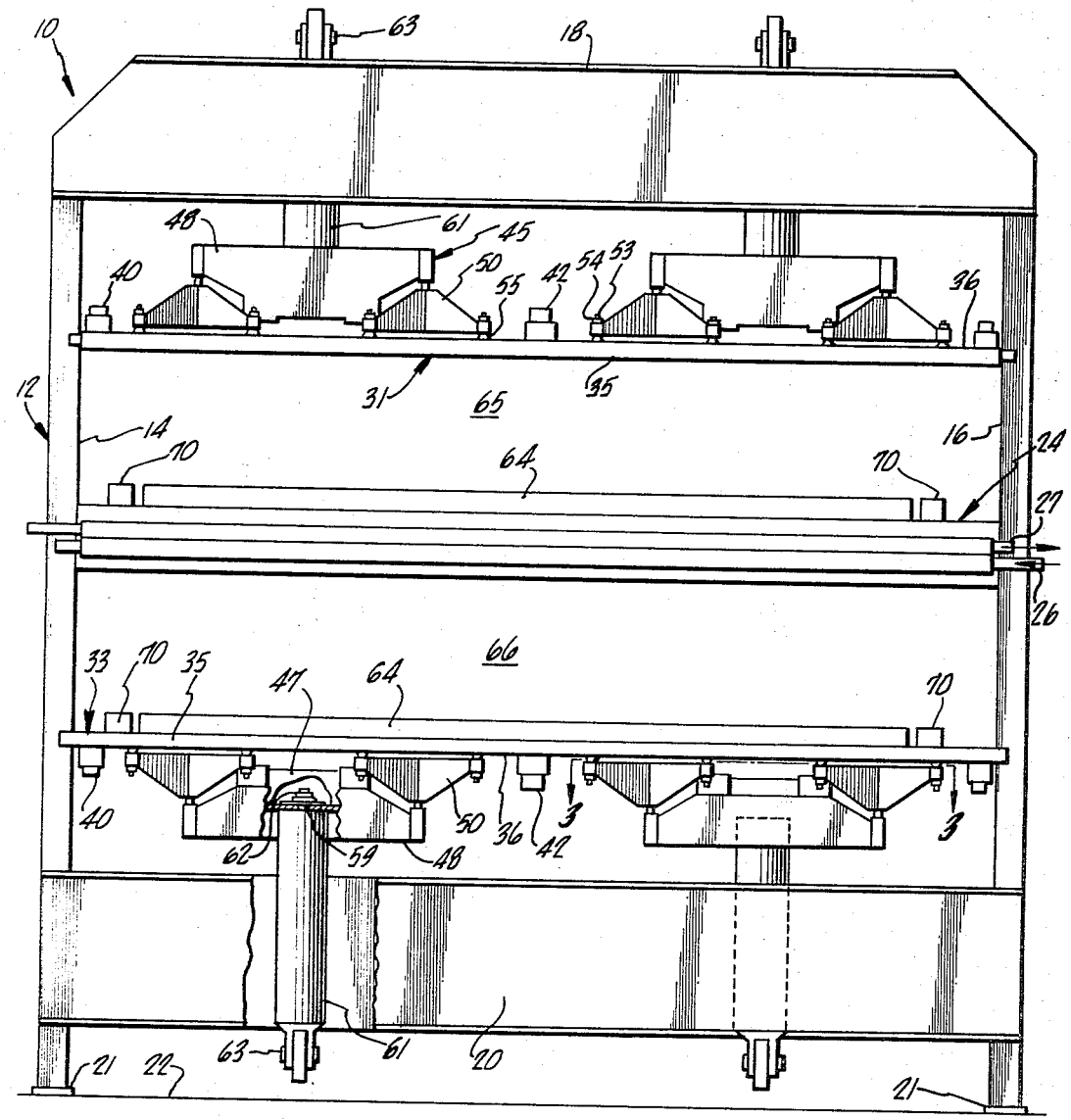
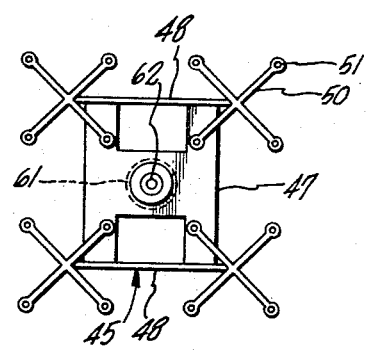
FIG. 2
FIG. 3
INVENTOR.
RUSSEL A. PARKER
BY
Christie, Parker & Hale
ATTORNEYS.

3,370,526
PRESS
Russel A. Parker, Los Angeles, Calif., assignor to L & F Machine Company, Los Angeles, Calif., a corporation of California
Filed Apr. 30, 1965, Ser. No. 452,103
5 Claims. (Cl. 100—93)

ABSTRACT OF THE DISCLOSURE

A double opening press having a stationary center platen secured to a supporting framework and a movable platen located on either side of the center platen. Actuators are connected with the movable platen to move them against the center platen with substantially equal force. The supporting framework is constructed to expand in response to thermal expansion of the center platen.

---

This invention relates to a heated double-opening press, especially suitable for forming and curing laminated panels.

In the fabrication of large laminated panels of plywood or honeycomb "sandwich" materials such as are commonly used in construction of houses and other structures, it is necessary to use a large-area press which can apply both heat and pressure to the laminated material. Heating is necessary to achieve a satisfactory bond of the laminating adhesives. The panels are typically large in size, ranging up to 15 feet or more in length and width, and from a fraction of an inch up to three or four inches in thickness.

Though a variety of shapes can be fabricated from these materials, the most common requirement is for flat panels having parallel sides. Since a panel will hold the shape assumed during the heat-and-pressure curing cycle in the press, a flat panel will result only if the press-platen faces which contact the panel are themselves flat and parallel to each other.

Presses which have been used in the past to form and cure such panels have been of massive construction to maintain alignment of the press over a large working area. Even with very rigid and massive construction, such presses have not always yielded satisfactory results due to mechanical deformations caused by heating of the press.

The press of this invention overcomes these disadvantages by employing a balanced-force design. This balance is achieved by utilizing a double-opening press, which employs a movable platen on each side of a stationary center platen. Two openings or work spaces are thus provided, one above and one below the center platen. The center platen is a relatively massive, rigid rectangular structure which is horizontally suspended within and secured to a series of laterally spaced upright frames. This platen is carefully constructed to provide upper and lower faces which are flat and parallel to each other.

An upper movable platen is disposed above the upper surface of the center platen, and is supported by a multiplicity of hydraulic cylinders which are in turn suspended from the tops of the upright frames. Similarly, a lower movable platen is disposed beneath the lower surface of the center platen, and is supported by a multiplicity of hydraulic cylinders which are in turn secured to the bottoms of the upright frames. As compared to the rigid center platen, both movable platens are relatively thin and compliant to provide a moderate amount of flexibility.

Each hydraulic cylinder is connected to a movable platen by a force-distributing spider which spreads the force transmitted from the cylinder across the movable platen. All hydraulic cylinders are manifolded to a common pressure source, resulting in equal forces being generated by each cylinder.

Both the center platen and the movable platens are provided with channels for the introduction of a heating medium such as hot water or steam. Thus all press surfaces which contact the laminated panel to be formed and cured can be maintained at an elevated temperature suitable to the curing characteristics of the laminating adhesives.

The flexible movable platens are designed to conform themselves to the panel surface against which they abut. They are sufficiently compliant that any tendency to warp as a result of heating is overcome by the force transmitted by the force-distributing spiders from the hydraulic cylinders.

In operation, panels are inserted in the two work spaces between the center platen and the two movable platens. The hydraulic cylinders are then pressurized, forcing the movable platens against the panels which in turn are forced against the stationary center platen. Since equal force is exerted on both sides of the center platen by the two movable platens through the panels, there is no tendency for the center platen to warp out of the desired planar shape. Further, uniform heat conditions are presented to both sides of the central platen, minimizing warpage resulting from unbalanced thermal conditions.

Balanced thermal loading results in a press capable of handling large panels, but which can be constructed from relatively light materials. Alignment is maintained over a wide range of press temperatures and pressures, without resorting to expansive construction from massive rigid materials. The use of two opposed movable platens not only provides a thermally and mechanically balanced structure, but also provides twice the work space available in a single-platen, single-opening press.

These and the other aspects of the invention will be more fully understood from the following detailed description taken in conjunction with the drawings in which:

FIG. 2 is a side elevation of the press, partly broken away to show mounting details of the hydraulic cylinders and spiders.

FIG. 3 is a plan view of a force-distributing spider taken along line 3—3 of FIG. 2.

Figure 1:
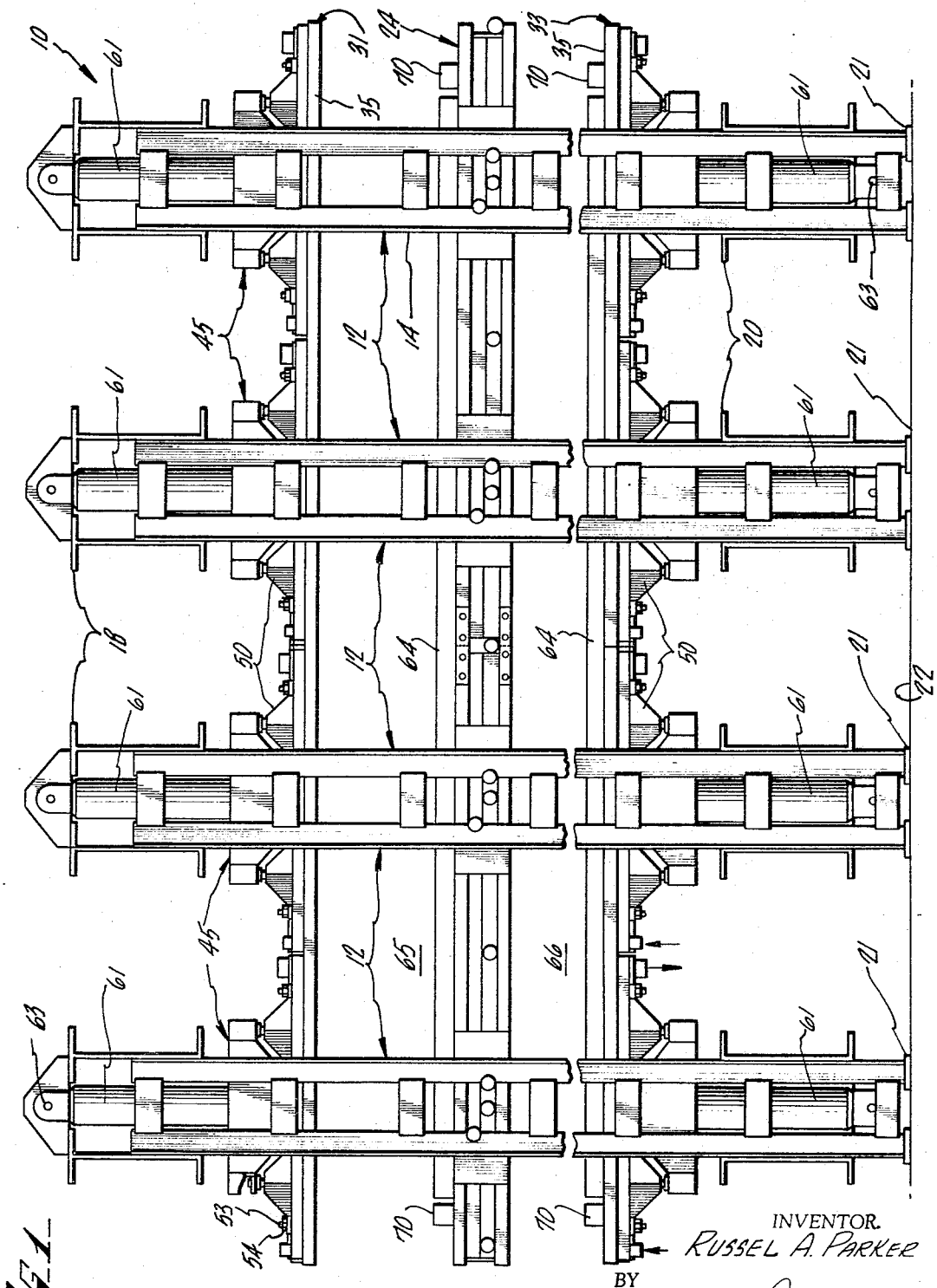
FIG. 1 is a front elevation of the press, partly broken away to show mounting details of the force-distributing spiders.

Referring to the drawings, the press 10 comprises a series of laterally spaced-apart upright frames 12, each frame including a front vertical post 14 and rear vertical post 16, the two vertical posts being connected at the top by horizontal cross member 18 and at the bottom by horizontal cross member 20. Vertical posts 14 and 16 are secured to and extend upward from mounting feet 21 which are free to slide laterally on floor 22.

A flat, rectangular center platen 24 is horizontally disposed inside the supporting frames 12 and is secured by welding or other attachment means midway up the vertical posts 14 and 16. A heating medium such as hot water or steam is pumped into the center platen 24 through inlet pipes 26. The heating medium circulates within the center platen and flows out through exit pipes 27 to an external pump and heater (not shown) for recirculation.

Disposed above the center platen 24 and inside the supporting frames 12 is an upper movable platen 31. Disposed below the center platen 24 and inside the supporting frames 12 is a lower movable platen 33. These two movable platens and their supporting structures are essentially identical in construction, but are mounted in an opposed relationship such that the upper platen can be moved down toward the center platen and the lower platen can be moved up toward the center platen.

Each movable platen has a work surface 35 which faces the center platen, and a back surface 36 to which a supporting structure is attached.

Heating channels are provided in the movable platens by a series of holes (not shown) bored through the width of the platens and spaced uniformly along the length of the platens. These holes are interconnected at the edges of the movable platens by inlet ducts 40 into which a heating medium such as hot water or steam is pumped. Outlet ducts 42 are mounted along the center of the back surface of each movable platen, providing an outlet for the heating medium to be returned to a pump and heater (not shown) for recirculation.

In most uses of the press, it is desirable to maintain the center platen and two movable platens at the same elevated temperature. This is accomplished by a conventional temperature-control system (not shown), platen temperatures being sensed by thermocouples or other types of temperature transducers.

The movable platens are secured within the supporting frames 12 by force-distributing spiders 45. A spider, most easily seen in FIG. 3, comprises a central H-shaped member 47, the ends of which are secured to two yokes 48. To each end of each yoke 48 is secured an X-shaped member 50, each leg of the X-shaped member terminating in an attachment hole 51.

Bolts 53, somewhat smaller in diameter than holes 51 to provide expansion clearance when the platen is heated, are welded or otherwise secured to the back of the movable platens. These bolts pass through holes 51 of the spiders and are secured by nuts 54. Each spider is thus secured to a movable platen at 16 points.

In the preferred form of the invention, spiders 45 are spaced apart from the movable platens by a thermal-insulating washer 55 constructed of material having low heat-transfer characteristics. Undesired heat transfer from the platens into the spiders is thus minimized.

A ram 59 of a hydraulic cylinder 61 is secured by a nut 62 to the center of each spider. The hydraulic cylinder is in turn secured to one of the two horizontal cross members 18 and 20 by a pin 63. Four such hydraulic cylinders are mounted within each upright frame 12, two being secured to the upper movable platen and two being secured to the lower movable platen.

In operation of the press, the center platen and two movable platens are first heated to the desired temperature. Laminated panels 64, to be formed and cured, are then loaded into work spaces 65 and 66 formed by the openings between the center platen and the two movable platens. Hydraulic cylinders 61, all being manifolded to a common pressure source, are then pressurized. The ram of each hydraulic cylinder moves toward the center platen, squeezing panels 64 between the movable platens and the center platen. Heat flows into the panels from the platens, and a stable temperature environment is achieved within a few minutes.

When the center platen is heated, it will expand in both length and width. The lengthwise extension is transmitted through the upright frames to the sliding feet 21, the expansion being taken up by motion of these feet along the mounting floor 22. Any tendency for the center platen to bow or warp as a result of lengthwise expansion is therefore eliminated. Expansion along the width of the center platen is absorbed by the upright posts 14 and 16 which bow outwardly from the expansion force. By transmitting these expansion forces to the several upright frames, the center platen remains flat when heated.

The movable upper and lower platens also expand in length and width when heated, but holes 51 are sufficiently oversize to allow bolts 53 to slide laterally within the holes, relieving forces tending to bow or warp the movable platens.

Bowing or warping of the center platen, as a result of mechanical forces exerted upon it by the movable platens through the panels, is minimized or eliminated because opposing forces are applied to both sides of the center platen. That is, the downward force from the upper platen is counterbalanced by the upward force from the lower platen, resulting in only compression forces on the center platen.

Bowing of the movable platens as a result of force from the hydraulic cylinders is minimized by the force-distributing spiders. The force from each cylinder is transmitted to its associated movable platen through the 16 laterally spaced attachment points of the spider structure.

Bowing of the movable platens is further minimized by the use of gauge blocks 70 which are spaced about the periphery of the panel being formed and cured. The gauge blocks are machined from solid metal to a thickness corresponding to the desired thickness of the finished panel. These blocks serve the dual functions of limiting the travel of the movable platens to avoid over-pressuring the panels being formed and cured, and preventing the relatively flexible movable platens from curving down over the edges of the panels.

In addition to the mechanically balanced structure of the press, a thermally balanced configuration is also provided by the opposing movable platens. Thermal radiation and conduction is approximately the same on both sides of the center platen as the upper and lower movable platens place the two sides of the center platen in an essentially uniform thermal environment.

Even if only one of the work spaces 65 and 66 is loaded with work, both movable platens are moved toward the center platen when the press is pressurized. Thus, for example, if a panel is loaded in space 65 and space 66 is left empty, the lower movable platen will move up against the lower face of the center platen, preserving the thermal and mechanical balance described above.

The press of this invention can be constructed from relatively light weight, thin-gauge materials resulting in a considerable cost saving. Only the center platen need incorporate the massive, rigid structure commonly found throughout other presses designed for this service. Uniform-quality panels are produced as any tendency for the press platens to bow or warp is greatly reduced or eliminated by the design of the press. The double-opening configuration has the further advantage that it will accept twice the amount of work per curing cycle as can be handled by a conventional single-opening press.

I claim:

1. Hydraulic press, comprising a supporting framework, a rigid, massive center platen secured to the framework, a first movable platen adjacent a first surface of the center platen, a second movable platen adjacent a second surface of the center platen, the first and second surfaces being on opposite sides of the center platen, hydraulic means secured to the framework and supporting each movable platen, the means moving the two movable platens simultaneously against the center platen with substantially equal force on each movable platen, and means for heating the center platen and two movable platens to substantially equal temperatures, each movable platen being of less mass and more flexible than the center platen to facilitate more uniform heating of the platens and compliance of the movable platens relative to the more rigid center platens.

2. Hydraulic press, comprising a supporting framework, a rigid, stationary center platen secured to the framework, the supporting framework having a configuration to expand in response to thermal expansion of the center platen such that the center platen is not subjected to deformation from heat expansions, a first movable platen adjacent a first surface of the center platen, a second movable platen adjacent a second surface of the center platen, the first and second surfaces being on opposite sides of the center platen, the two movable platens being relatively thin and pliant as compared to the rigid center platen, hydraulic means secured to the framework and supporting each movable platen, the means being capable of simultaneously moving the two movable platens against the center platen with substantially equal force on each movable platen, and means for heating the center platen and two movable platens to substantially equal temperatures.

3. Hydraulic press, comprising a multiplicity of laterally spaced supporting frames, each frame having front and rear vertical posts, a stationary horizontal center platen secured to the posts, the posts having a configuration to deflect in response to thermal expansion of the center platen in an amount about equal to the thermal expansion of the center platen in a direction transverse to the spacing of the supporting frames, each post being secured to and extending upward from a mounting foot resting on a floor, the foot being free to slide laterally on the floor, a first movable platen adjacent a first surface of the center platen, a second movable platen adjacent a second surface of the center platen, the first and second surfaces being on opposite sides of the center platen, hydraulic means secured to the frames and supporting each movable platen, the hydraulic means being capable of moving the two movable platens against the center platen with substantially equal force on each movable platen, and means for heating the center platen and two movable platens.

4. Hydraulic press, comprising a supporting framework, a massive, rigid center platen secured to the framework, a first movable platen adjacent a first surface of the center platen, a second movable platen adjacent a second surface of the center platen, the first and second surfaces being on opposite sides of the center platen, a multiplicity of hydraulic cylinders secured to the framework and supporting each movable platen, the cylinders being disposed in a uniform spaced-apart array to distribute an applied force over each of the two movable platens, the cylinders being capable of simultaneously moving the two movable platens against the center platen with substantially equal total force on each movable platen, and means for heating the center platen and two movable platens, each movable platen being of less mass and more flexible than the center platen so the movable platens are compliant relative to the center platen.

5. A press comprising a supporting framework, a massive rigid center platen having first and second surfaces on opposite sides, a first outer platen disposed adjacent the first surface of the center platen, a second outer platen disposed adjacent the second surface of the center platen, means secured to the framework and supporting the platens, means for moving the platens together and apart, and means for heating the platens, the two outer platens each being of less mass and more flexible than the center platen so the outer platens are compliant relative to the center platen.

References Cited
UNITED STATES PATENTS

| | | | |
|---|---|---|---|
| 823,175 | 6/1906 | Jungel | 144—281 |
| 2,358,526 | 9/1944 | Mitchel et al. | 100—208 X |
| 2,431,943 | 12/1947 | Land et al. | |
| 2,458,858 | 1/1949 | Kelly et al. | 100—221 X |
| 2,627,289 | 2/1953 | Berthelsen | 144—281 |
| 2,627,883 | 2/1953 | Littley | 144—281 |
| 2,784,754 | 3/1957 | Berthelsen | 144—281 |
| 3,139,816 | 7/1964 | Jemison et al. | 100—93 X |
| 3,229,401 | 1/1966 | Sobran. | |

FOREIGN PATENTS

| | | |
|---|---|---|
| 714,157 | 10/1931 | France. |
| 724,287 | 2/1955 | Great Britain. |

LOUIS O. MAASSEL, *Primary Examiner.*